United States Patent
Rigollet (10) Patent No.: US 10,634,270 B2
(45) Date of Patent: Apr. 28, 2020

(54) CLAMPING SYSTEM WITH CONTROLLED ANGULAR POSITIONING FOR CONNECTING TOGETHER TWO TUBES

(71) Applicant: ETABLISSEMENTS CAILLAU, Issy les Moulineaux (FR)

(72) Inventor: Nicolas Rigollet, Romorantin (FR)

(73) Assignee: Etablissements Caillau, Issy les Moulineaux (FR)

( * ) Notice: Subject to any disclaimer, the term of this patent is extended or adjusted under 35 U.S.C. 154(b) by 0 days.

(21) Appl. No.: 15/722,162

(22) Filed: Oct. 2, 2017

(65) Prior Publication Data

US 2018/0094755 A1    Apr. 5, 2018

(30) Foreign Application Priority Data

Oct. 4, 2016 (FR) ...................... 16 59571

(51) Int. Cl.
| | |
|---|---|
| *F16L 23/08* | (2006.01) |
| *F16L 23/20* | (2006.01) |
| *F16L 19/02* | (2006.01) |
| *F16L 23/16* | (2006.01) |

(52) U.S. Cl.
CPC ........... *F16L 23/08* (2013.01); *F16L 19/0206* (2013.01); *F16L 23/162* (2013.01); *F16L 23/20* (2013.01)

(58) Field of Classification Search
CPC .......... F16L 23/08; F16L 23/003; F16L 23/04
USPC ................... 285/365, 366, 367, 409, 410, 23
See application file for complete search history.

(56) References Cited

U.S. PATENT DOCUMENTS

| | | | | |
|---|---|---|---|---|
| 2,269,664 A * | 1/1942 | Hallerberg | .............. | F16L 23/08 |
| | | | | 285/367 |
| 2,456,048 A * | 12/1948 | Carpenter | ............... | F16L 21/08 |
| | | | | 285/409 |
| 3,822,075 A | 7/1974 | Duncan | | |
| 3,889,984 A * | 6/1975 | Lambiris | .................. | F16L 25/04 |
| | | | | 285/420 |
| 4,372,017 A * | 2/1983 | Heckethorn | ............ | F16L 25/04 |
| | | | | 285/420 |
| 5,782,499 A * | 7/1998 | Gfrerer | .................... | F16L 23/08 |
| | | | | 285/23 |
| 7,300,005 B2 * | 11/2007 | Bowman | ............... | E04F 21/085 |
| | | | | 241/101.2 |

(Continued)

FOREIGN PATENT DOCUMENTS

| | | |
|---|---|---|
| EP | 1 451 498 A1 | 9/2004 |
| EP | 2 474 721 A1 | 7/2012 |

(Continued)

OTHER PUBLICATIONS

EPO Search Report, dated May 19, 2017, Henri Fromentel, for FR Patent Application No. 1659571, 2 pages.

*Primary Examiner* — David Bochna
(74) *Attorney, Agent, or Firm* — Fay Sharpe LLP; James E. Scarbrough (57) ABSTRACT

A system for connecting a first tube (1) and a second tube, the system comprising a clamping collar (10) suitable for being tightened around the abutted ends of the two tubes, and a washer (28) secured to the clamping collar by securing means. The washer (28) presents a blocking element (44) configured to co-operate with a corresponding positioning member (48) of the first tube (1) so as to block the washer (28) against turning relative to the first tube (1).

13 Claims, 5 Drawing Sheets

(56) References Cited

U.S. PATENT DOCUMENTS

| | | | | |
|---|---|---|---|---|
| 7,399,005 | B2 * | 7/2008 | Rigollet | F16L 23/08 24/279 |
| 7,520,539 | B2 * | 4/2009 | Ignaczak | F16L 21/065 285/367 |
| 7,770,937 | B2 * | 8/2010 | Ignaczak | F16L 27/04 285/410 |
| 2014/0217728 | A1 * | 8/2014 | Ghirardi | F16L 23/08 285/410 |
| 2017/0254454 | A1 * | 9/2017 | Vosgeois | F16L 23/08 |
| 2017/0292643 | A1 * | 10/2017 | Prevot | F16L 23/08 |

FOREIGN PATENT DOCUMENTS

| | | | | |
|---|---|---|---|---|
| EP | 2474721 | A1 * | 7/2012 | F16L 23/08 |
| EP | 2 598 785 | A1 | 6/2013 | |
| FR | 2833065 | A1 * | 6/2003 | F16L 23/08 |
| FR | 3050232 | A3 * | 10/2017 | F16L 23/08 |
| WO | WO-2012013891 | A1 * | 2/2012 | F16L 23/08 |

* cited by examiner

CLAMPING SYSTEM WITH CONTROLLED ANGULAR POSITIONING FOR CONNECTING TOGETHER TWO TUBES

CLAIM OF PRIORITY

This application claims priority from French Patent Application No. FR 1659571, filed on Oct. 4, 2016, and is incorporated herein by reference in its entirety.

BACKGROUND OF THE DISCLOSURE

The present invention relates to a system for connecting together a first tube and a second tube, the system comprising a clamping collar suitable for being tightened around the abutted ends of the two tubes, and a washer secured to the clamping collar by securing means.

A clamping system of this type is known from European patent EP 1 451 498. In that patent, the facing tube ends present bearing surfaces that project relative to the cylindrical outside surfaces of said tubes. The clamping collar comprises a clamping band of section that may for example be substantially V-shaped or U-shaped, so that the branches formed by that section bear respectively against the bearing surface of the first tube and against the bearing surface of the second tube. Thus, tightening the collar tends to hold the two tubes clamped one against the other. The V-shaped section is advantageous insofar as it serves, while the collar is being tightened, to move the tubes towards each other.

For example, the means for tightening the band may comprise a nut-and-bolt system. Thus, the ends of the band may be upstanding so as to form bearing tabs each having a hole through which a bolt can be inserted. A nut is arranged behind one of the tabs so that turning the bolt tightens the collar. Nevertheless, other tightening means may be provided, e.g. of the type operating by hooking, in particular of the type comprising a hook stood up relative to the band and a lug likewise stood up relative to the band, the hook becoming attached behind the lug so as to hold the collar in the tightened state.

The washer of the clamping system may in particular serve to provide sealing for the connection between the two tubes, by presenting for this purpose a sealing portion that, when the system is tightened on the tubes, is engaged between two sealing surfaces belonging respectively to the first tube and to the second tube.

In certain applications, it is also desired to guarantee that the clamping system occupies a certain angular position relative to the first tube, in particular for controlling the position of the bearing tabs and of the bolt and to optimize the space occupied by the system, or indeed to facilitate access for operators to the clamping system while it is being assembled or disassembled.

International application WO 2016/034820 discloses another clamping system for connecting two tubes together, the system comprising a clamping collar having a retaining tab. The retaining tab presents a fastener portion on the clamping band of the collar and an attachment portion whereby said retaining tab is suitable for being attached to the first tube. Such a retaining tab provides satisfaction for holding the angular position of the clamping collar relative to the first tube. Nevertheless, it occupies additional space outside the first tube and needs to be attached to the first tube during an additional step, e.g. a welding step, thereby lengthening the process of assembling the tubes together.

There therefore exists a need for a novel type of connection and clamping system for remedying the above-mentioned drawbacks, and in particular for controlling the angular position of the clamping system relative to the first tube in a manner that is simple, fast, and compact.

SUMMARY OF THE DISCLOSURE

This object is achieved by the fact that the washer presents a blocking element configured to co-operate with a corresponding positioning member of the first tube so as to block the washer against turning relative to the first tube.

Thus, the co-operation between the blocking element and the positioning member ensures that the clamping system and the first tube are arranged angularly relative to each other in the desired manner. This angular position may be predetermined by the respective locations selected for the blocking element on the washer and for the positioning element on the first tube. In addition, the co-operation between the blocking element and the positioning member serves to avoid having recourse to a third part such as a retaining tab, thereby limiting the complexity of the clamping system. Furthermore, insofar as the angular position is controlled by the washer co-operating with the first tube, no additional space is occupied outside said tube, unlike the system proposed in WO 2016/034820.

In an example, the above-mentioned washer may be of the same type as the washers described in published patent applications EP 1 451 498, WO 2012/013891, or FR 3 048 468. In addition to the characteristic of the invention as described above, the washer may have some or all of the characteristics described in those patent applications.

In addition, the blocking element is provided substantially on a smallest diameter portion (i.e. a portion having the smallest diameter) of the washer, thereby further reducing the space it occupies. The term "substantially" is used to mean that the blocking element is in the proximity of a smallest diameter portion of the washer, e.g. at a distance from the smallest diameter portion of the washer that does not exceed 40% of the axial length of the washer, preferably 30%, more preferably 20%, more preferably 15%, more preferably 10%, more preferably 5%.

Optionally, the blocking element comprises a blocking tab configured to be received in the positioning member of the first tube. Thus, the co-operation between the blocking element and the positioning member is co-operation that is simple, mechanical, and geometrical and that does not require any particular fastening operation.

In addition, the washer is generally made of metal, by stamping, cutting, and folding. When fabricating the washer, it is easy to make a tab thereon to form the blocking tab. More generically, the blocking tab may be formed integrally with the washer.

Optionally, the blocking tab projects radially towards the inside of the washer. The inside should be understood relative to the axis about which the washer is wound. In general, and unless specified to the contrary, the terms "inside" and "outside" or indeed "inner" and "outer" are used relative to a radial direction such that an inner portion of an element is closer to the axis of the washer in a radial direction than is an outer portion of the same element. The fact that the blocking tab projects radially towards the inside of the washer further limits the space occupied.

Optionally, the blocking tab projects from a substantially smallest diameter portion of the washer. In particular, when the facing tube ends present bearing surfaces that project relative to the cylindrical outside surfaces of said tubes, the washer is advantageously substantially frustoconical in shape.

Thus, the blocking tab projects radially inwards relative to the remainder of the washer. Alternatively, or in addition, the blocking tab may project axially and/or radially beyond the remainder of the washer.

Furthermore, the blocking element, specifically the blocking tab, may be formed on an edge of the washer.

Optionally, when the system is assembled on the first tube, the blocking tab projects towards an edge of said end of the first tube, i.e. the end of the first tube that is to be abutted against the second tube.

Optionally, the blocking tab is substantially plane.

Optionally, the washer includes cutouts on either side of the blocking tab. Such cutouts are preferably longitudinal relative to the blocking tab. The cutouts may be situated at the base of the blocking tab, i.e. at its proximal end.

The cutouts enable the blocking tab to be separate from the washer over a length that is greater than would be possible without cutouts. This increases the flexibility of the blocking tab and makes it easier for it to co-operate with the positioning member of the first tube.

Optionally, the blocking tab is curved in axial section. An axial section is a section on a plane that contains the axis, specifically the axis of the washer. For example, the blocking tab may be in a shape of a hook, of convex shape, or of concave shape. A curved shape limits the deflection of the blocking tab, which would block insertion of the clamping system on the first tube if the blocking element and the positioning member do not co-operate. The blocking tab can thus act as keying means and serve even better to ensure that the clamping system is properly positioned relative to the first tube.

The blocking tab may also have other shapes.

In its general definition, the invention provides at least one blocking element and at least one positioning member. It is possible to provide a plurality of blocking elements, e.g. two or three blocking elements that are angularly distributed in regular or irregular manner, and that co-operate with corresponding positioning members.

The invention also provides an assembly for connecting together two tubes, the assembly comprising a system as described above and a first tube on which said system is assembled and which is suitable for being abutted with a second tube, the first tube having a positioning member co-operating with the blocking element of the system.

This assembly comprises the system of the invention together with the first tube on which the system can be pre-assembled in a state in which the clamping collar is not tightened but extends around the first tube.

Optionally, the first tube includes, preferably at its end, a radial projection extended by an annular extension, typically an axial extension, preferably an extension that is substantially cylindrical. The positioning member may be formed at least in part in said extension.

Optionally, the positioning member extends from an edge of the end of the first tube that is suitable for being abutted with the second tube. Thus, the blocking element can guarantee proper angular positioning of the clamping system relative to the first tube as from insertion of said system on the first tube beside said edge.

Optionally, the first tube has a radial projection, and the positioning member extends as far as the radial projection. Thus, the co-operation between the positioning member and the blocking element does not prevent the washer from coming against the radial projection and thus providing good sealing.

Optionally, the positioning member comprises a notch, an orifice, or a setback.

Optionally, in the non-tightened state, the clamping collar is radially spaced apart from the washer. Thus, an annular space is defined between the band of the collar and the washer, into which space the second tube can be inserted in order to connect and couple together the tubes.

The invention and its advantages can be better understood on reading the following detailed description of embodiments of the invention given as non-limiting examples.

BRIEF DESCRIPTION OF THE DRAWINGS

The description refers to the accompanying drawings, in which.

DETAILED DESCRIPTION OF THE DISCLOSURE

Figure 1:
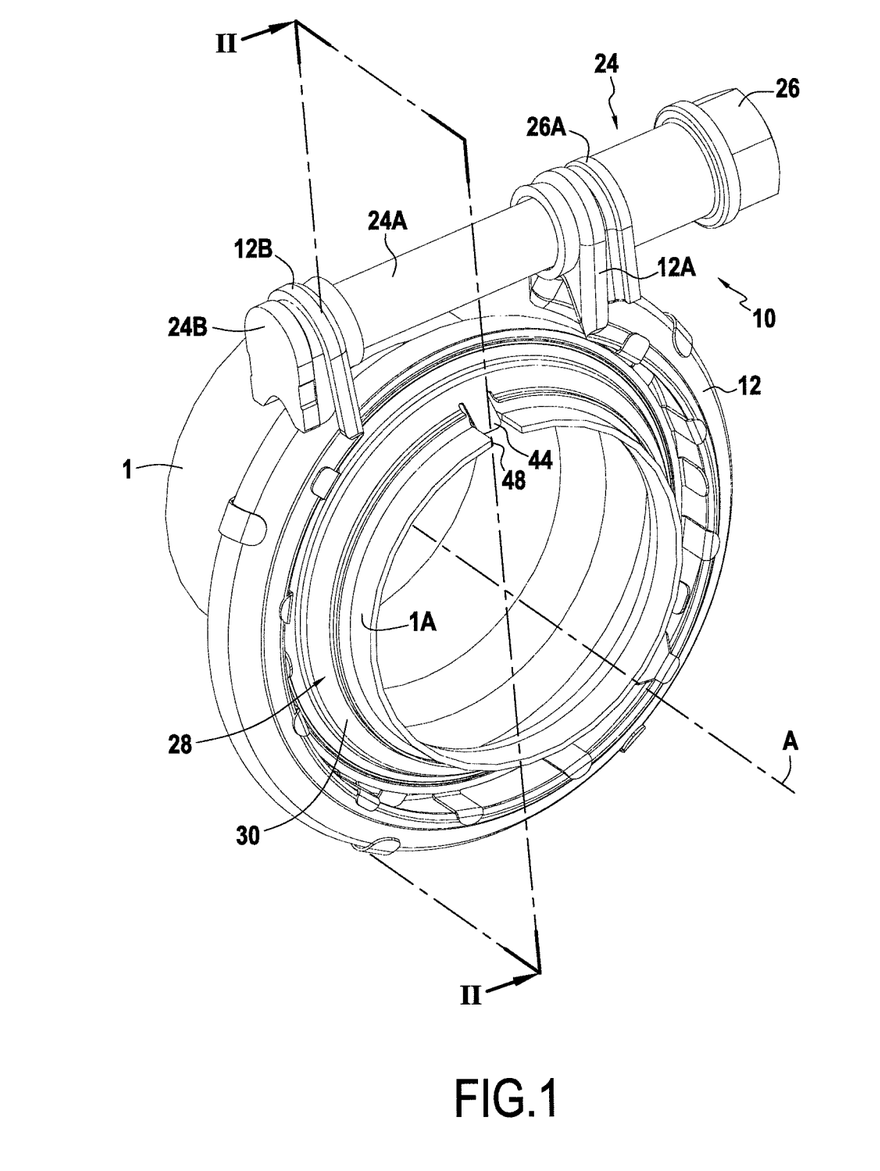
FIG. 1 is a perspective view showing the system pre-assembled at the end of the first tube, before clamping the collar.
Figure 2:
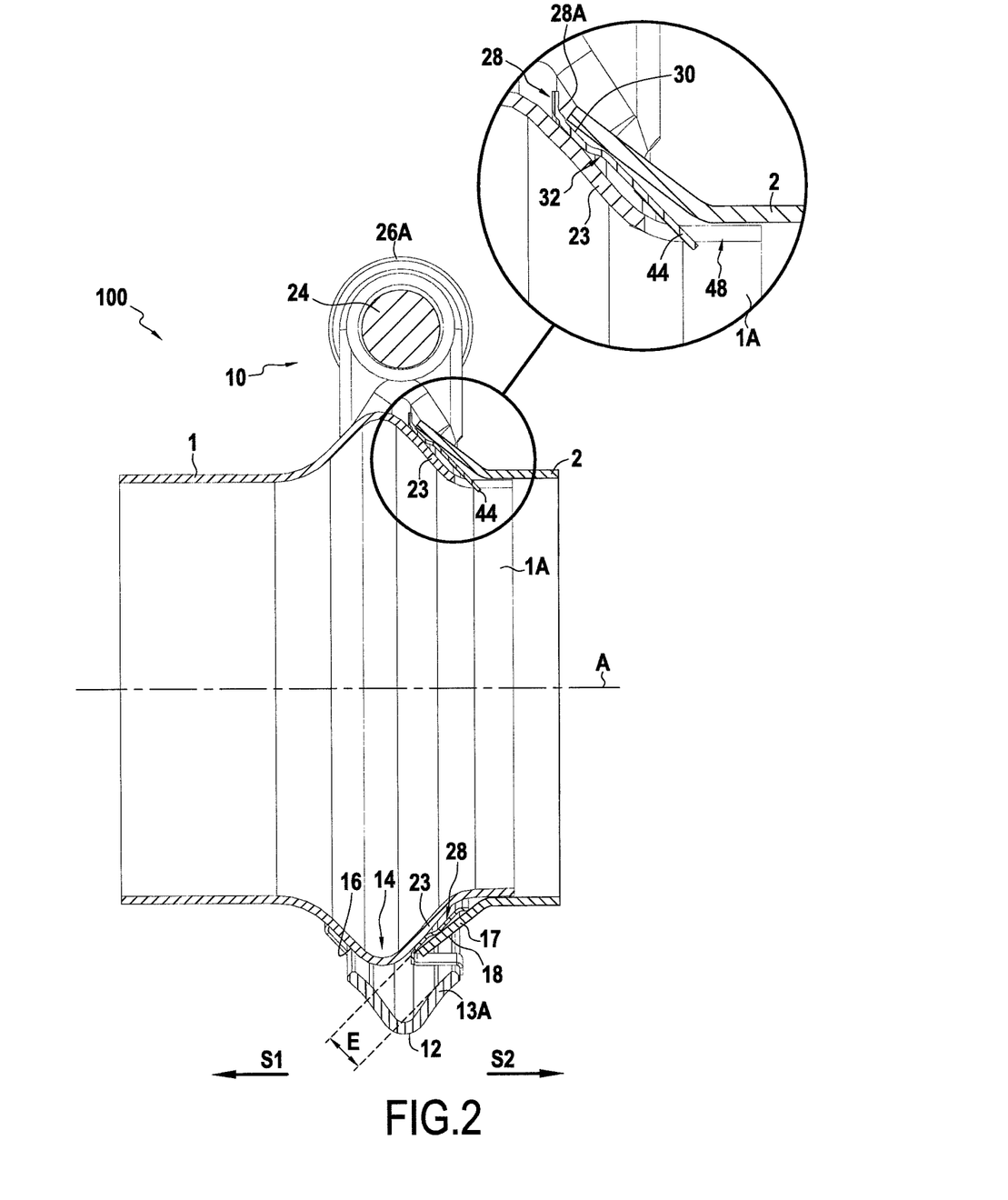
FIG. 2 is a section view on plane II of FIG. 1, this plane being defined by the axis of the tube and by a diameter of the tube passing through the blocking element.
Figure 3:
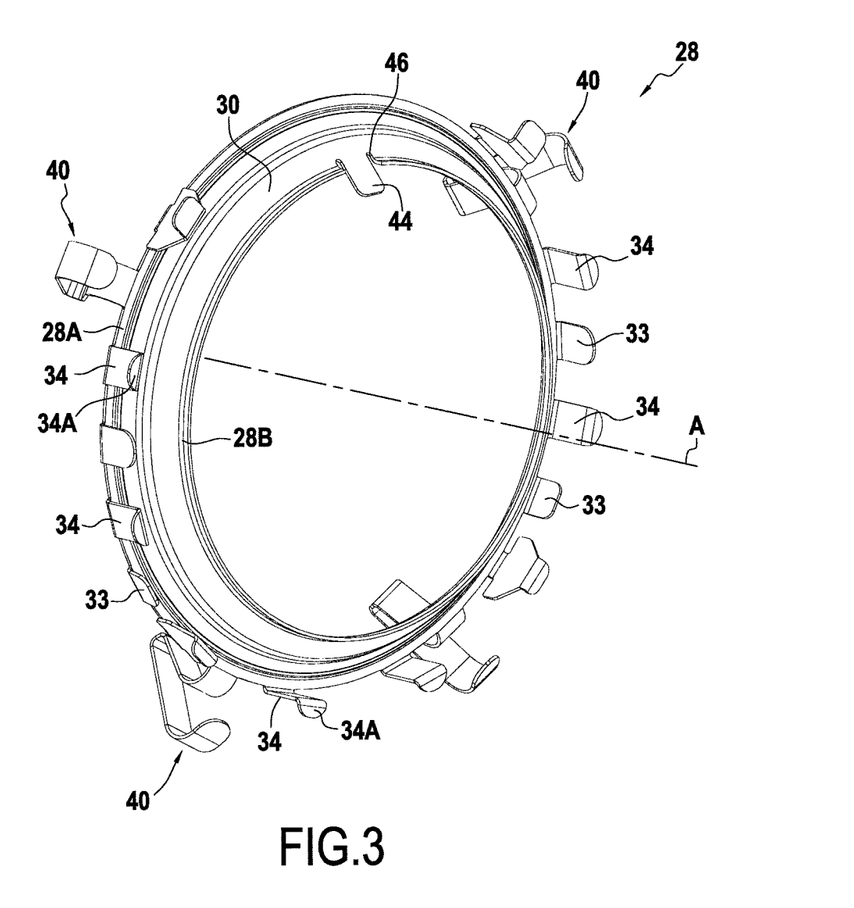
FIG. 3 is a perspective view of the FIG. 1 washer, in isolation.

The description begins with FIGS. 1 to 3. In these figures, it can be seen that the clamping system comprises a collar 10, generally of the same type as that described in EP 1 451 498 and WO 2012/013891, and a washer 28, that co-operate to assemble together two tubes 1 and 2. It should nevertheless be understood that the invention is not limited to this type of collar.

As mentioned above, the term "inner" is used to designate elements that face towards the axis A of the two tubes placed end to end or that are closer to the axis A relative to other elements that are said to be "outer", the "outer" elements also being elements that face away from the axis A.

Specifically, and as can be seen in FIGS. 1 and 2, the collar comprises a band 12 that has an inner periphery that defines a setback 14 in which it is possible to insert bearing surfaces, respectively a bearing surface 16 forming part of the first tube 1 and a bearing surface 18 forming part of the second tube 2. This setback and its bearing surfaces are of shapes such that tightening the band of the collar constrains the ends of the tubes to move towards each other. Thus, the band 12 advantageously presents a V-shaped section, while the bearing surfaces 16 and 18 are of a diameter that increases gradually towards the facing free ends of the tubes, and for example are frustoconical in shape. The band 12 presents respective ends 12A and 12B that are stood up substantially radially so as to form bearing tabs. These tabs are pierced so as to pass the shank 24A of a bolt 24 through the tabs. The head 24B of the bolt is held relative to one of the bearing tabs, specifically the tab 12B, while a nut 26 is held relative to the other bearing tab 12A. It can be understood that turning the nut in the screw-tightening direction causes the bearing tabs to move towards each other and thus reduces the inside diameter of the collar, i.e. it enables the band to be tightened. Specifically, a holder washer 26A is interposed between the bearing tab 12A and the nut 26, this washer 26A having a notch that holds it relative to the tip of the V-shape formed by the band 12 in order to prevent it from turning relative thereto while turning the bolt 24.

The clamping system also has the washer 28, which is secured to the collar. This washer presents a frustoconical annular portion 30 that, as can be seen in FIG. 2, is suitable for inserting between the facing ends of the two tubes when they are clamped together using the clamping system. With reference to FIG. 2, it can be seen that in the pre-assembled state of the collar 10 at the end of the tube 1, an annular space E is left between the washer 28 pre-assembled on the outer periphery 23 of the first tube 1 and the inner periphery of the band 12 of the collar. FIGS. 1 and 2 also show that in the pre-assembled state, the collar is substantially centered relative to the tube, the axis A of the collar and of the washer coinciding in these figures with the axis of the first tube 1. Thus, the annular space E enables the end of a second tube 2 to be inserted under the band 12 of the collar and enables the two tubes to be coupled together.

In this respect, it should be observed that the end of the tube 2 is a female end, its inner periphery presenting a flare. In contrast, the end of the tube 1 is a male end that, beyond the bearing surface 18, presents an outer periphery 23 of diameter that decreases going towards the free end. The end portion as formed in this way can thus be inserted inside the flare 17 formed at the free end of the tube 2, their shapes being substantially complementary. The frustoconical portion 30 of the washer is situated between the flare 17 and the outer periphery 23 of the free end of the tube 1. The frustoconical portion of the washer 30 presents annular deformations 32 forming a sealing gasket. The flare 17 formed at the inner periphery of the free end of the tube 2, and the outer periphery of the end portion 23 of the tube 1 thus form sealing surfaces that, once the clamping system has been tightened, take between them the frustoconical portion 30 of the washer and compress the sealing gasket 32 so that the connection between the tubes is sealed.

The washer 28 can be fastened to the collar 10, and the pre-assembly of the assembly constituted by the collar 10 and the washer 28 on the first tube 1 can be pre-assembled in the same manner as in EP 1 451 498 and WO 2016/034820, using fastener tabs presented by the washer 28.

Thus, the washer 28 presents a series of inner tabs 33 that can be seen more clearly in FIG. 3. When the washer is assembled with the collar, these inner tabs co-operate with the inner periphery of one of the branches of the band 12, specifically the branch 13A. These inner tabs serve to hold the washer at a distance from the inner periphery of the branch 13A. As can be seen in particular in FIGS. 1 and 3, the fastener tabs also include outer tabs 34 that are long enough to make contact with the free inner edge of the branch 13A. The inner tabs 33 may be raised radially a little going towards their free ends so that these free ends come more reliably to bear against the inner periphery of the branch 13A. In contrast, the outer tabs 33 are directed substantially axially so as to pass under the free inner edge of the branch 13A. It can be seen that the free ends of these outer tabs 34 are curved in order to form respective hooks 34A that hook onto the outer face of the branch 13A.

Optionally, the inner tabs 33 and the outer tabs 34 may present other characteristics from among those described in detail in published patent applications EP 1 451 498, WO 2012/013891, or FR 3 048 468. Where appropriate, the outer tabs 34 may form or include first pre-assembly tabs that enable the clamping system to be pre-assembled on the second tube 2.

In FIGS. 1 to 3, second pre-assembly means comprise second pre-assembly tabs 40 that are situated on a second side of the washer 28 opposite from its first side, and that extend specifically in the axial direction S2 away from the outer periphery 28A of the washer. In the embodiment shown, and as can be seen better in FIG. 3, these second pre-assembly tabs 40 are similar to the second pre-assembly tabs disclosed in WO 2012/013891. They may have some or all of the characteristics listed in that document and they may be presented at least in the variants that are described therein, and particularly but not exclusively in the embodiment of FIG. 7C of that document. The second pre-assembly tab 40 serves to secure the washer 28 to the first tube 1. Other securing means could be used.

Furthermore, as mentioned above, the washer 28 presents a blocking element configured to co-operate with a corresponding positioning element of the first tube 1 so as to block the washer 28 against turning relative to the first tube 1. Specifically, the blocking element comprises a blocking tab 44 configured to co-operate with a notch 48 of the first tube 1.

In the example of FIGS. 1 to 3, the blocking tab 44 projects radially towards the inside of the washer 28 and axially towards the free end of the first tube 1, i.e. the end that is to be brought into abutment with an end of the second tube 2. Specifically, the blocking tab 44 extends the frustoconical portion 30, in this example from the radially inner side of the washer 28. Thus, ignoring the cutouts 46 that are described below, the blocking tab 44 projects from a substantially smallest diameter portion of the washer 28, specifically the inner periphery 28B of the washer 28. The end of the blocking tab 44 remote from the washer 28, i.e. its "distal" end, extends further towards the inside of the washer than does the smallest diameter portion of the washer 28. Furthermore, as can be seen in particular in FIG. 3, the blocking tab 44 projects from an end of the washer 28, more precisely an end of the frustoconical portion 30 of the washer, that is axially remote from the end from which the fastener tabs, the inner tabs 33, the outer tabs 34, and/or the second pre-assembly tabs 40 all project.

As shown on a larger scale in the detail of FIG. 2, the blocking tab 44 passes radially through the notch 48, thereby preventing the washer 28 from turning relative to the first tube 1. For this purpose, the blocking tab 44 may have an angular width that is slightly smaller than the angular width of the notch 48, e.g. lying in the range 50% to 100% of the angular width of the notch 48.

In this embodiment, the blocking tab 44 is substantially plane, at least in axial section. In the circumferential direction, the blocking tab 44 may have curvature corresponding to the circumferential curve of the frustoconical portion 30 of the washer 28.

Furthermore, the flexibility of the blocking tab 44 is increased by means of cutouts 46 in the washer on either side of the blocking tab 44. As can be seen more particularly in FIG. 3, the cutouts 46 are longitudinal and extend along the blocking tab 44. The cutouts 46 have a non-zero component in the direction of the axis A.

In addition, the projecting portion 23 of the first tube 1 is extended away from the bearing surface 16 by a substantially annular extension 1A. The annular extension 1A preferably has a diameter that is smaller than the diameter of the remainder of the first tube 1 so that it is possible, as shown in FIG. 2, to engage the second tube 2 on the extension 1A given that the second tube, with the exception of the flare 17, has a diameter that is substantially equal to the diameter of a main portion of the first tube 1. The extension 1A could equally well take other forms, for example it could be substantially frustoconical in shape, or made up of a plurality of discontinuous extensions that are angularly distributed, regularly or otherwise.

In this embodiment, the extension 1A is an axial extension, specifically a substantially cylindrical axial extension, i.e. it is cylindrical with the exception of the notch 48, for example. The positioning member constituted in this example by the notch 48 is formed in the extension 1A.

More precisely, in this embodiment, the notch 48 extends from the edge of the end of the first tube 1 that is suitable for being brought into abutment against the second tube 2 and as far as the radial projection of the first tube 1, formed in this example by the outer periphery 23. Thus, the blocking tab 44 and the notch 48 can co-operate as soon as the clamping system, and in particular the washer 28, is engaged on the first tube 1 and until the washer 28 comes into abutment against the outer periphery 23, both in the non-tightened state and in the tightened state of the clamping system.

Conversely, the notch 48 need not have an open end. In other words, instead of comprising a notch properly speaking, the positioning member could comprise an orifice situated at a distance from the edge of the end of the first tube 1. When engaging the clamping system on the first tube, the blocking tab 44 flexes until it can enter into the orifice, forming a kind of clip fastener. This operation is made easier when the blocking tab 44 projects towards an edge of the end of the first tube 1.

Once in the orifice, the blocking tab 44 returns to its initial position. Co-operation between the blocking tab 44 forming the blocking element and the orifice forming the positioning member then provides not only radial blocking, but also axial blocking of the washer 28 relative to the first tube 1. This axial blocking enables the clamping system to be held on the first tube 1. If this hold is sufficiently stable, which can be achieved if necessary by providing a plurality of blocking tabs 44 of the kind as explained above, it is possible to simplify or even eliminate the second pre-assembly tabs 40, which serve in particular to provide axial blocking of the washer 28 relative to the first tube 1.

Figure 4:
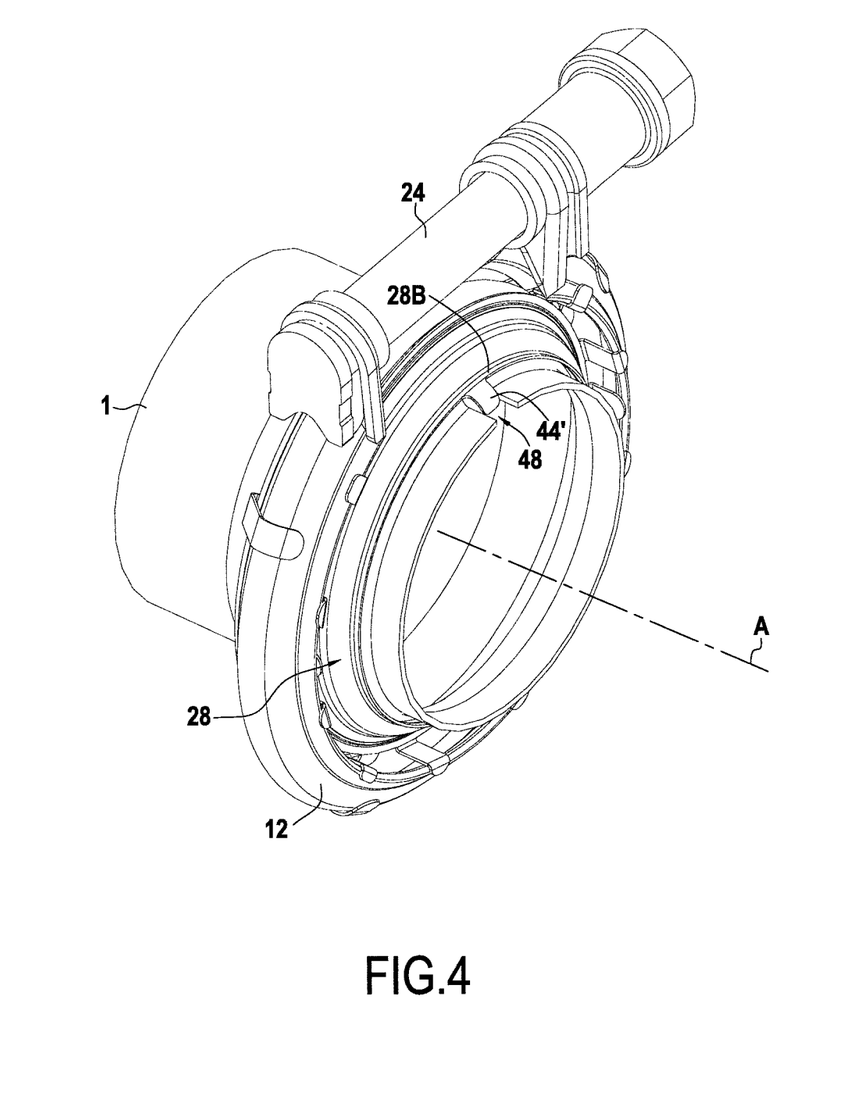
FIG. 4 is a view analogous to FIG. 1, for a connection assembly in a second embodiment.
Figure 5:
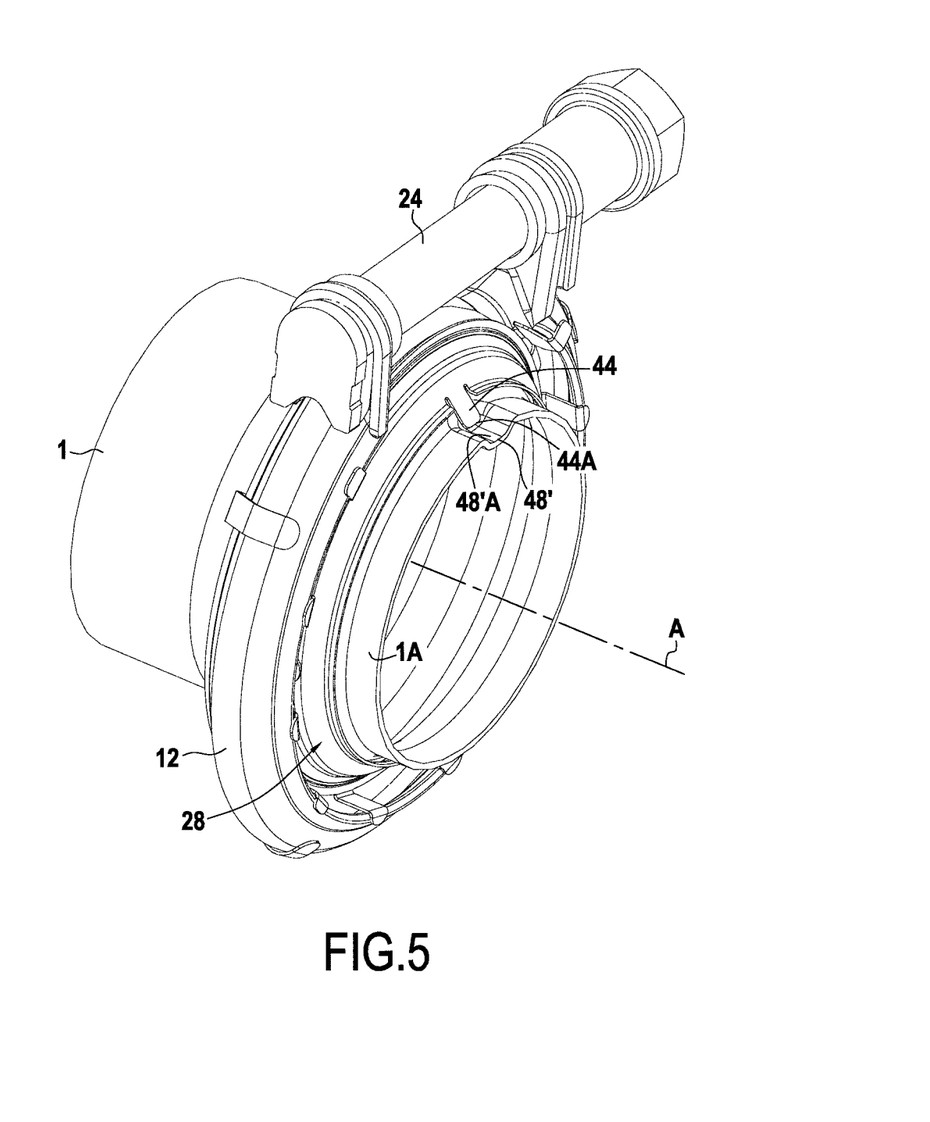
FIG. 5 is a view analogous to FIG. 1, for a connection assembly in a third embodiment.

FIGS. 4 and 5 show the connection assembly in other embodiments. In these figures, elements that correspond to or are identical with those of the first embodiment are given the same reference signs and are not described again.

A second embodiment, shown in FIG. 4, is identical to the first embodiment of FIG. 1 except concerning the shape of the blocking element. Specifically, in this embodiment, the blocking element comprises a blocking tab 44' that is curved in axial section. Typically, the blocking tab 44' may be in the form of a hook configured to hook the notch 48. In addition, in this embodiment, the washer 28 does not have cutouts 46.

A third embodiment, shown in FIG. 5, is identical to the first embodiment of FIG. 1 except concerning the shape of the positioning member. Specifically, in this embodiment, the positioning member of the first tube 1 comprises a setback 48'. Like the notch 48, the setback 48' is formed in the extension 1A and it extends from the edge of the end of the first tube 1 as far as the radial projection of the first tube 1, which is formed in this example by the outer periphery 23. The setback 48' projects in the radial direction towards the inside of the first tube 1. Furthermore, in order to avoid any wear of the first tube 1 or of the blocking element, the distance to the axis A from the bottom wall 48'A of the setback 48' is less than the distance to the axis A from the distal end 44A of the blocking tab. The setback 48 may be obtained by stamping.

In all of the embodiments shown, once the clamping system is in a waiting position at the end of the first tube 1, i.e. in the pre-assembly situation, it can be manipulated as a unit together with the first tube. In order to assemble the first tube 1 with the second tube 2, the second tube is brought towards the end of the first tube with the end of the second tube being inserted into the above-mentioned annular space E, and then the collar is tightened in conventional manner. Specifically the clamping means of the collar comprise the above-mentioned bolt that, when the nut is bolted onto the threaded shank of the bolt, reduces the space between the bearing tabs 12A and 12B. Other tightening means could naturally be envisaged, in particular a hook system or a pinching system.

In addition, it is clear that the blocking element with a curved blocking tab 44' of the second embodiment is compatible with the setback 48' of the third embodiment. Other shapes may also be envisaged both for the blocking element and also for the positioning member, e.g. projections of types other than the tabs 44 and 44'. The blocking element may also be configured to receive a projection forming the positioning member of the first tube, unlike the configuration described in the above examples.

More generally, although the present invention is described with reference to specific embodiments, modifications may be made to those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A system for connecting a first tube and a second tube, the system comprising a clamping collar suitable for being tightened around the abutted ends of the two tubes, and a washer secured to the clamping collar by securing means,
   wherein the washer presents a blocking element configured to co-operate with a corresponding positioning member of the first tube so as to block the washer against turning relative to the first tube, the blocking element being provided substantially on a smallest diameter portion of the washer, and
   wherein, when the system is assembled on the first tube, the blocking element projects towards an edge of said end of the first tube.

2. An assembly for connecting together two tubes, the assembly comprising the system according to claim 1 and a first tube on which said system is assembled and which is suitable for being abutted with a second tube, the first tube having a positioning member co-operating with the blocking element of the system.

3. The assembly according to claim 2, wherein the positioning member extends from an edge of the end of the first tube that is suitable for being abutted with the second tube.

4. The assembly according to claim 2, wherein the first tube has a radial projection, and the positioning member extends as far as the radial projection.

5. The assembly according to claim 2, wherein the positioning member comprises a notch, an orifice, or a setback.

6. A system for connecting a first tube and a second tube, the system comprising a clamping collar suitable for being tightened around the abutted ends of the two tubes, and a washer secured to the clamping collar by securing means,
   wherein the washer presents a blocking element configured to co-operate with a corresponding positioning member of the first tube so as to block the washer against turning relative to the first tube, the blocking element being provided substantially on a smallest diameter portion of the washer, wherein the blocking element comprises a blocking tab configured to be received in the positioning member of the first tube.

7. The system according to claim 6, wherein the blocking tab projects radially towards the inside of the washer.

8. The system according to claim 6, wherein, when the system is assembled on the first tube, the blocking tab projects towards an edge of said end of the first tube.

9. The system according to claim 6, wherein the blocking tab is plane at least in axial section.

10. The system according to claim 6, wherein the washer includes cutouts on either side of the blocking tab.

11. The system according to claim 6, wherein the blocking tab is curved in axial section.

12. An assembly connecting together two tubes, the system comprising the two tubes, a clamping collar suitable for being tightened around the abutted ends of the two tubes, and a washer secured to the clamping collar by securing means, the washer having a portion suitable for inserting between facing ends of the two tubes when the two tubes are clamped together, the two tubes comprise a first tube and a second tube, wherein the first tube is suitable for being abutted with the second tube, wherein the washer presents a blocking element co-operating with a corresponding positioning member of the first tube so as to rotationally align the washer and the first tube and to block the washer against turning relative to the first tube.

13. The assembly according to claim 12, wherein the blocking element is provided on said portion of the washer.

* * * * *